United States Patent Office 3,461,459
Patented Aug. 12, 1969

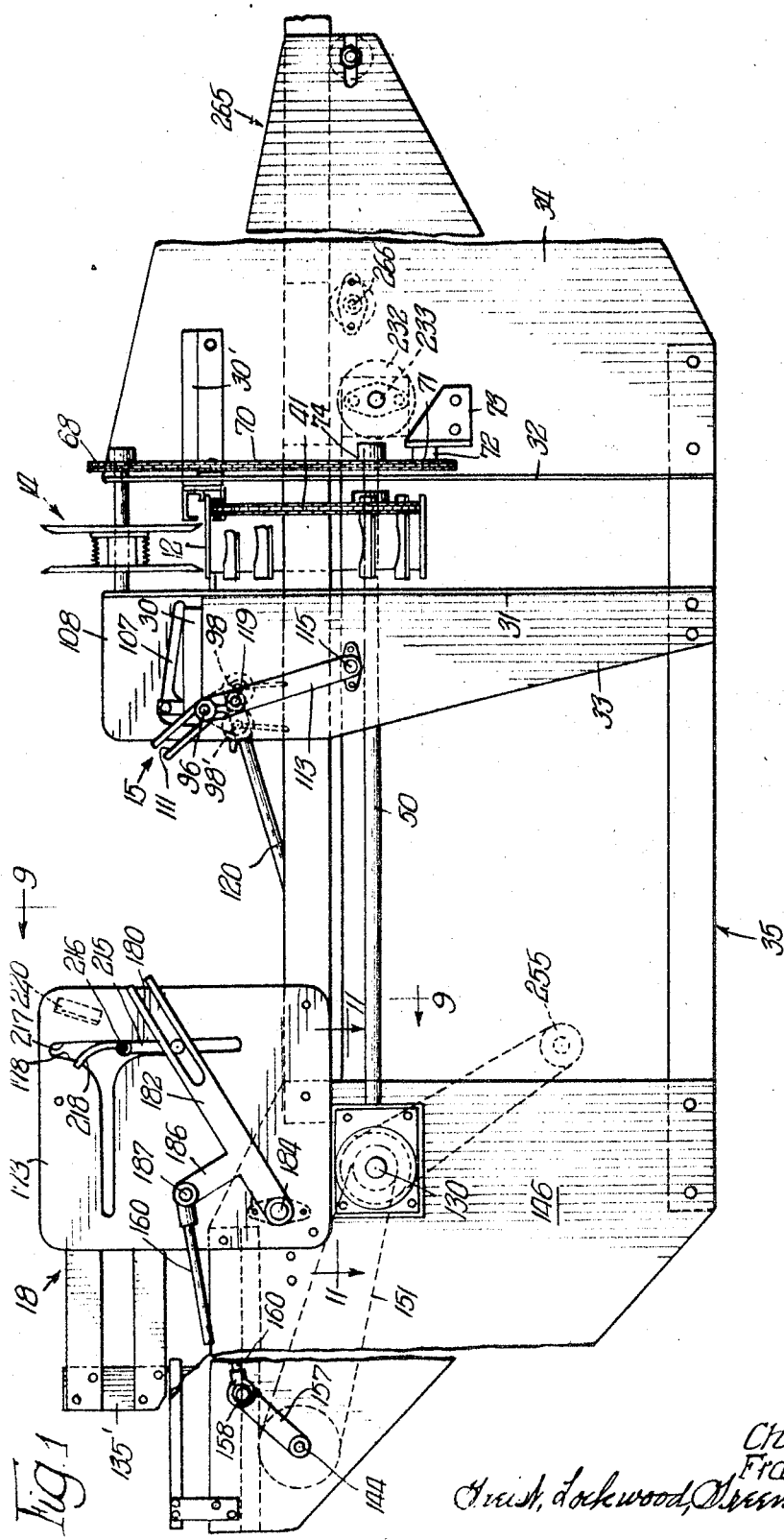

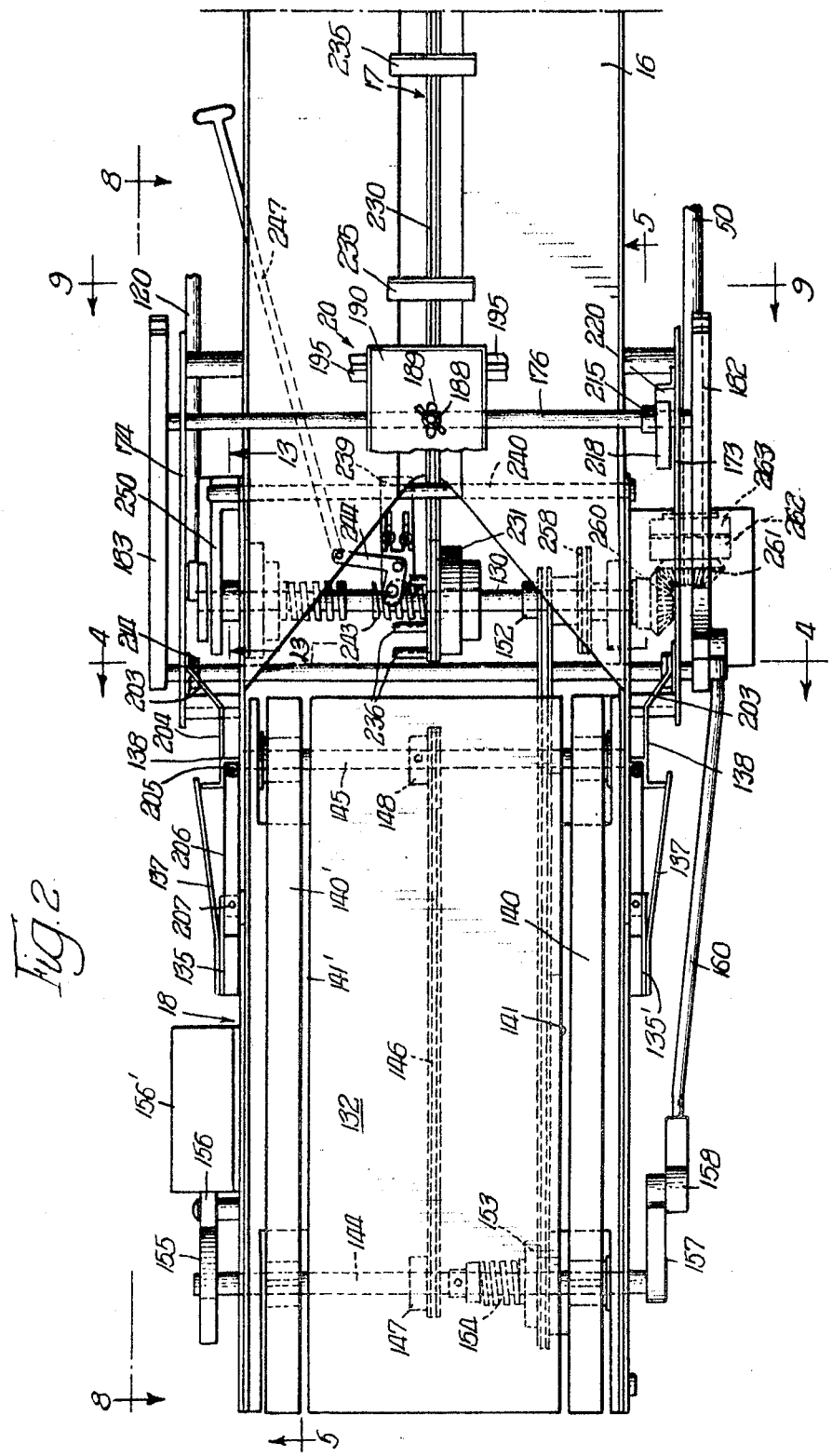

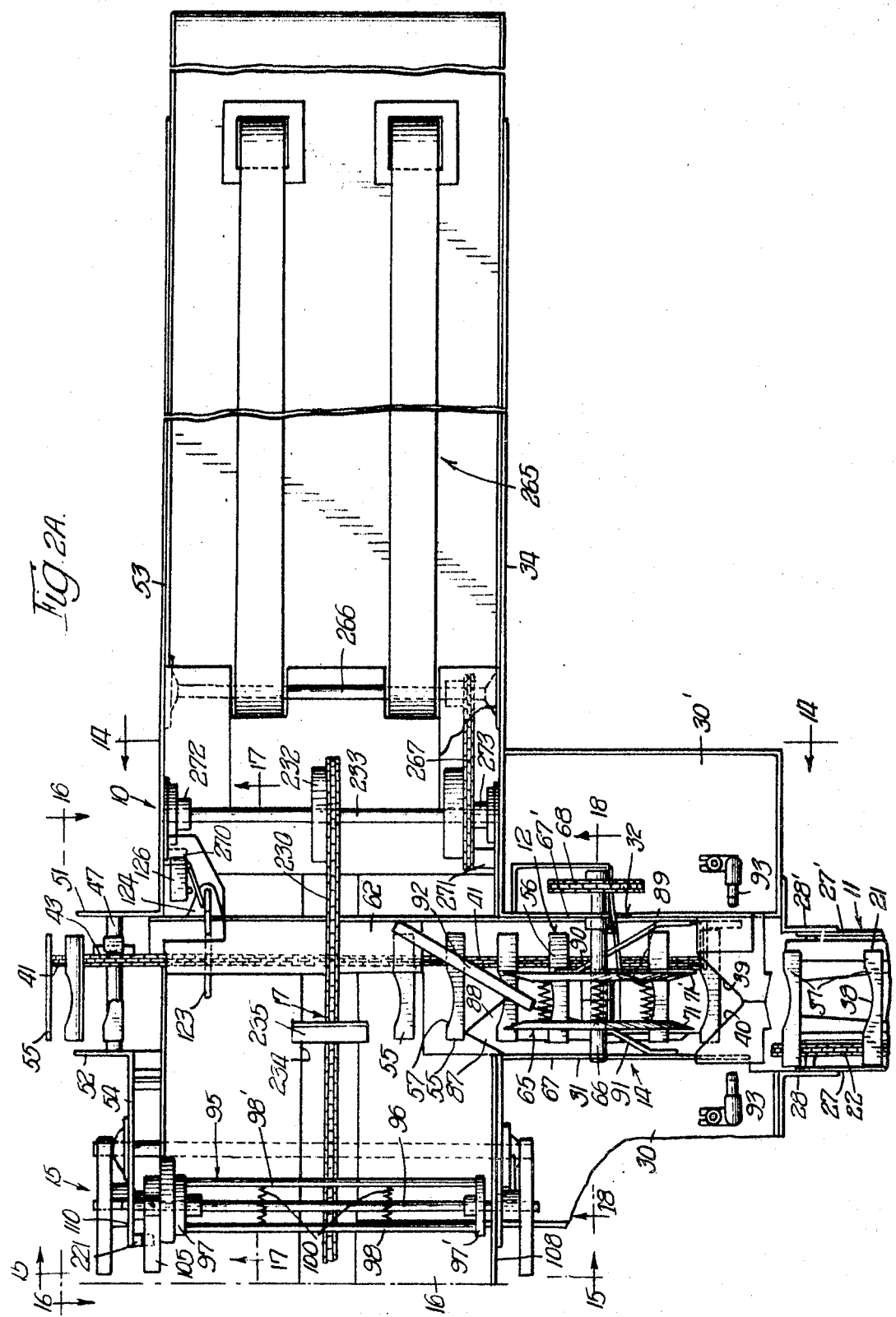

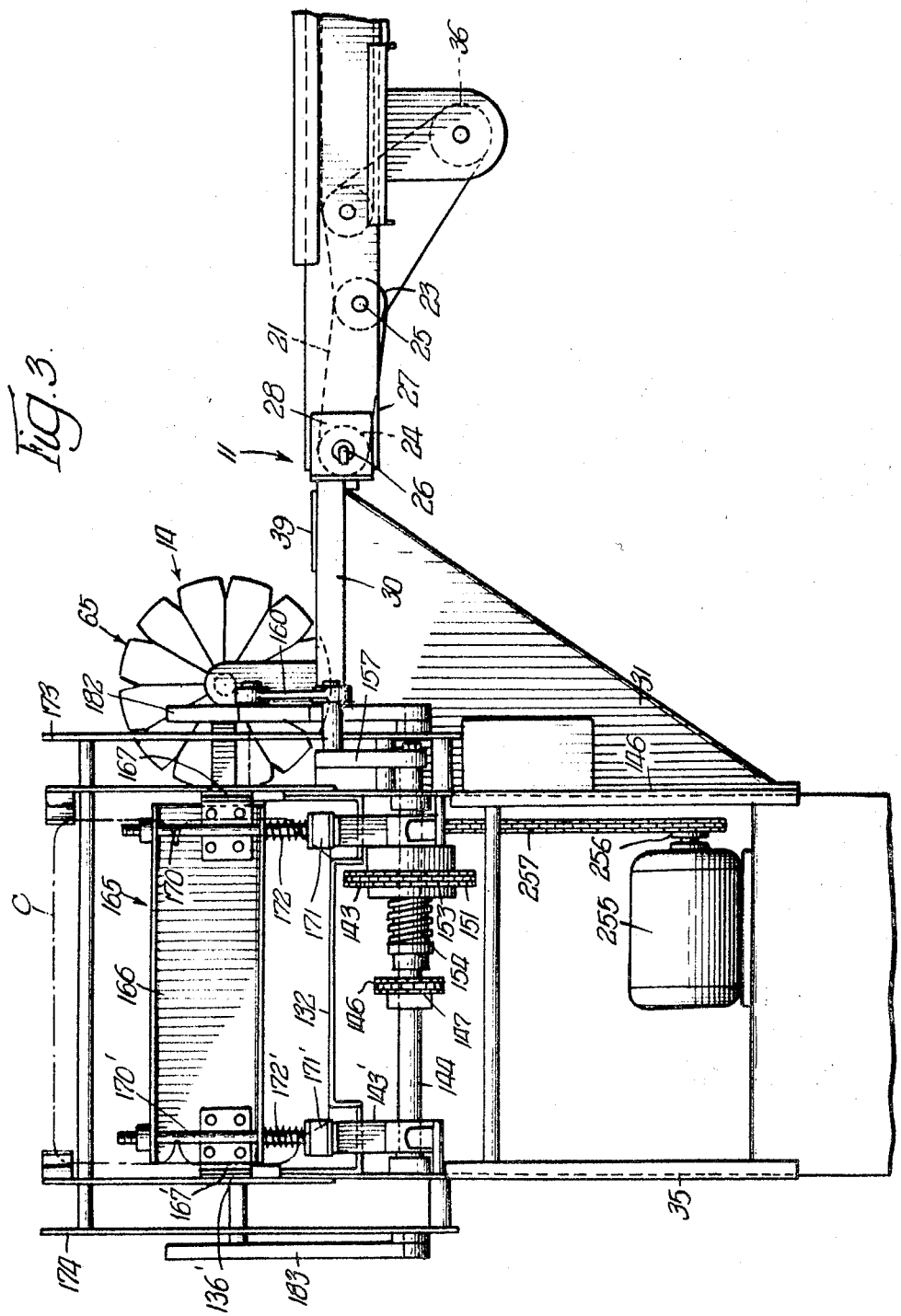

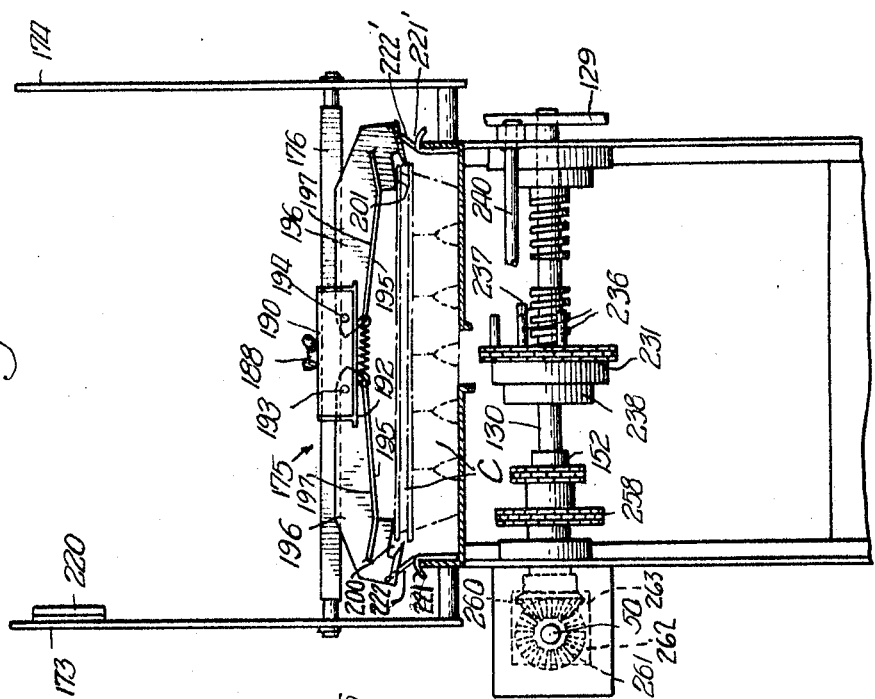

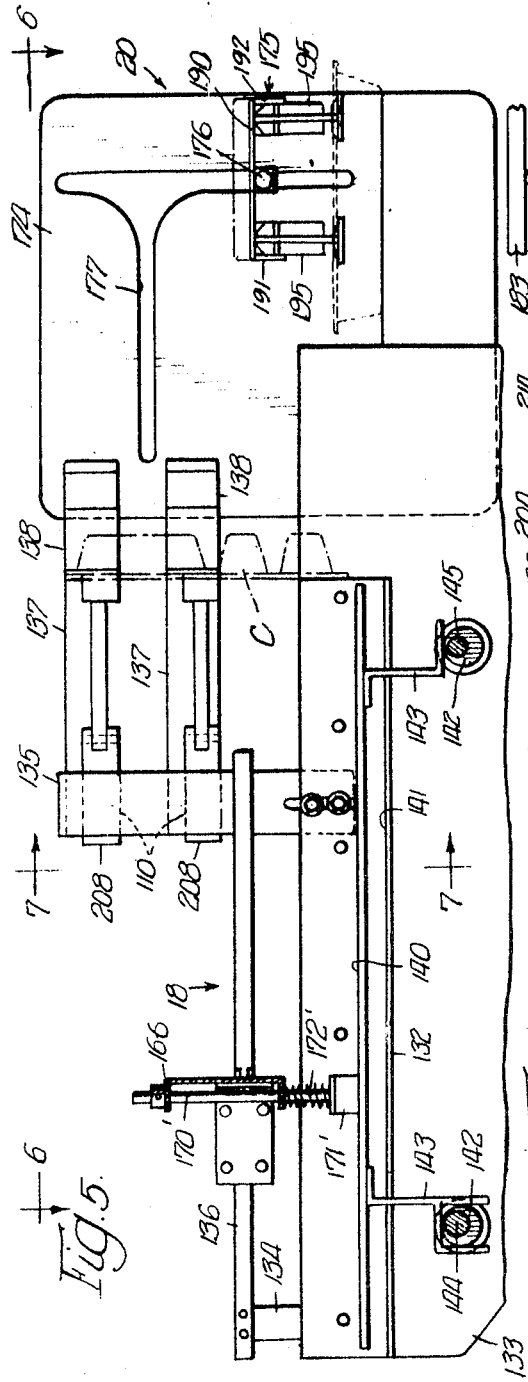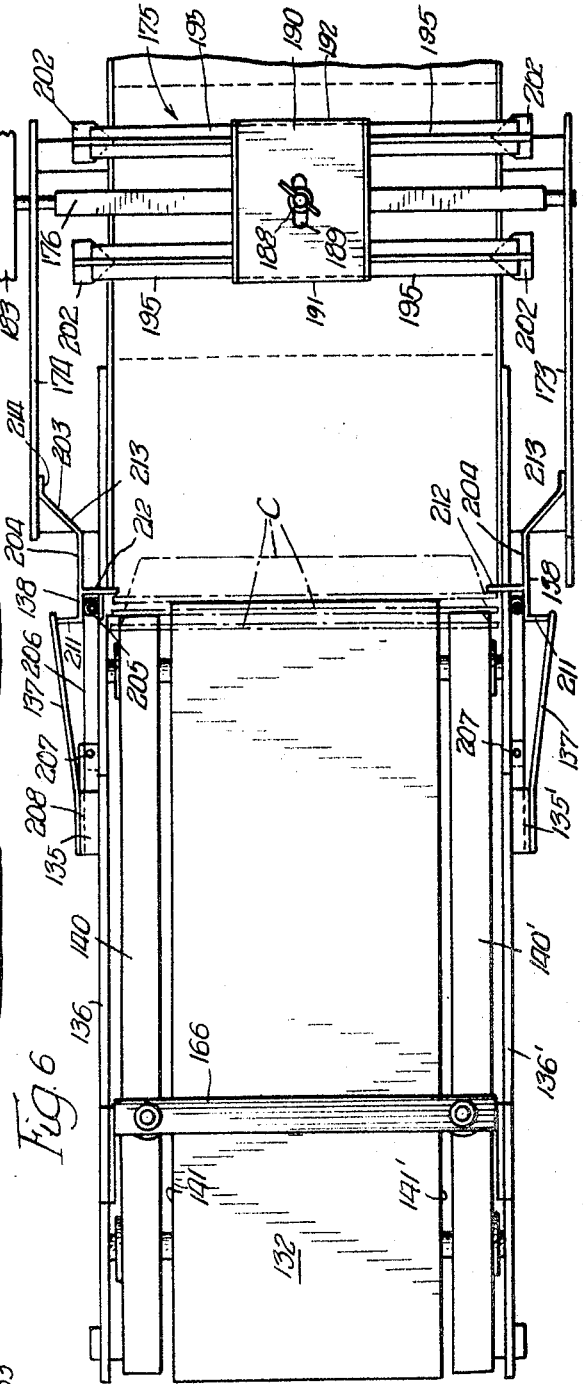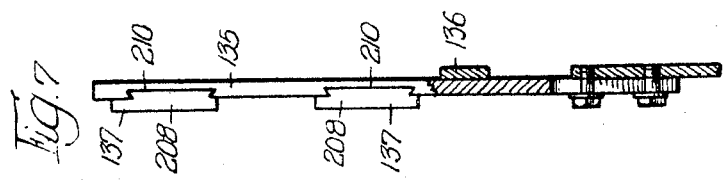

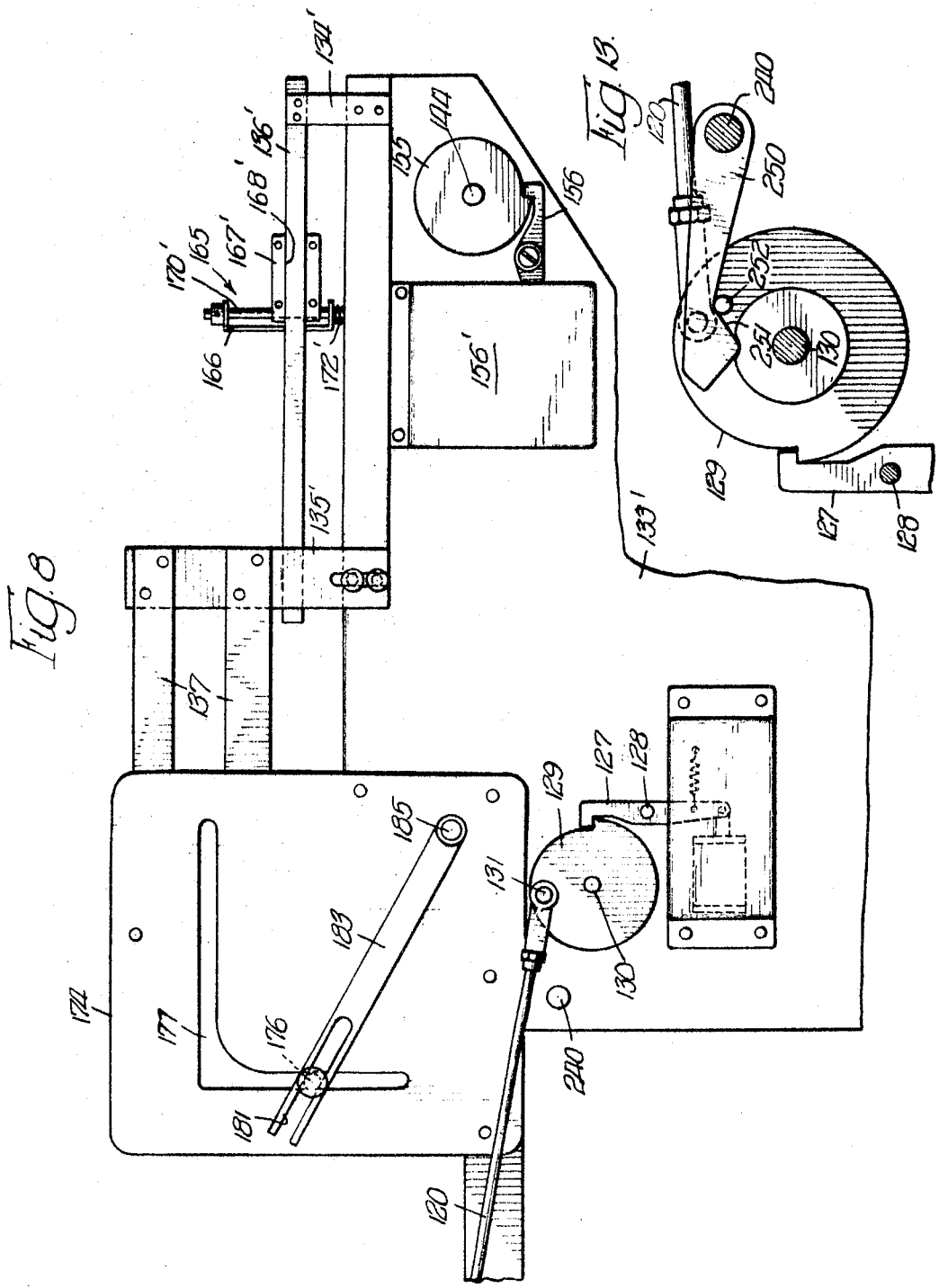

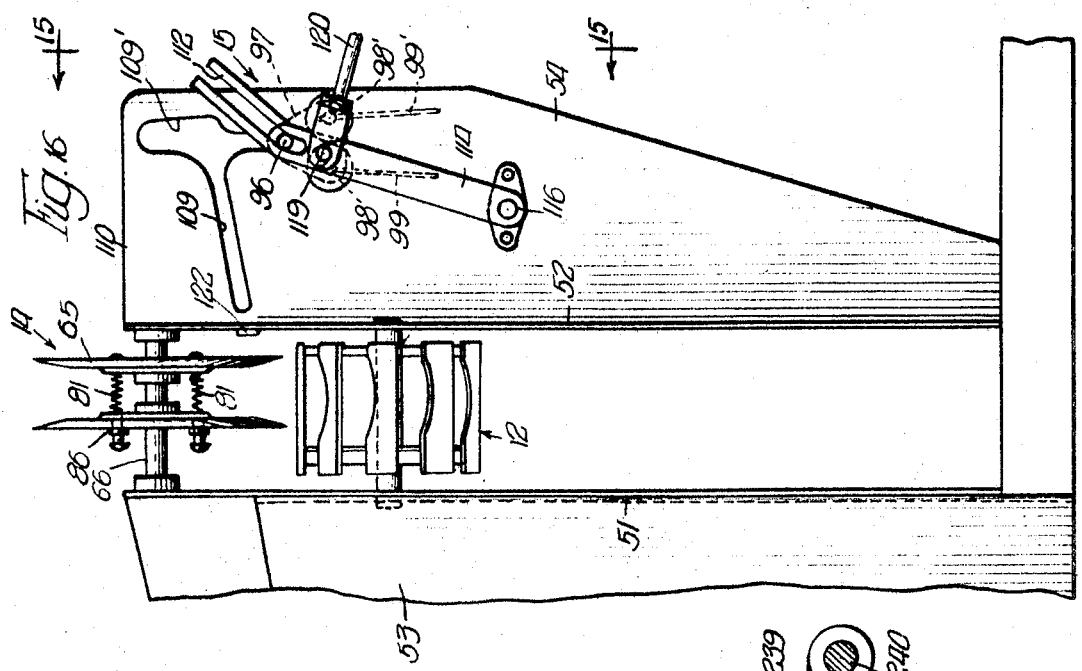
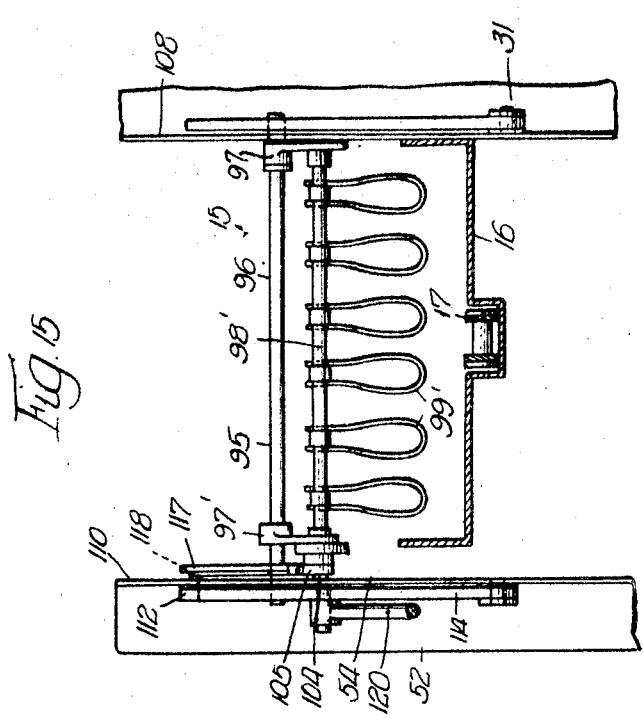
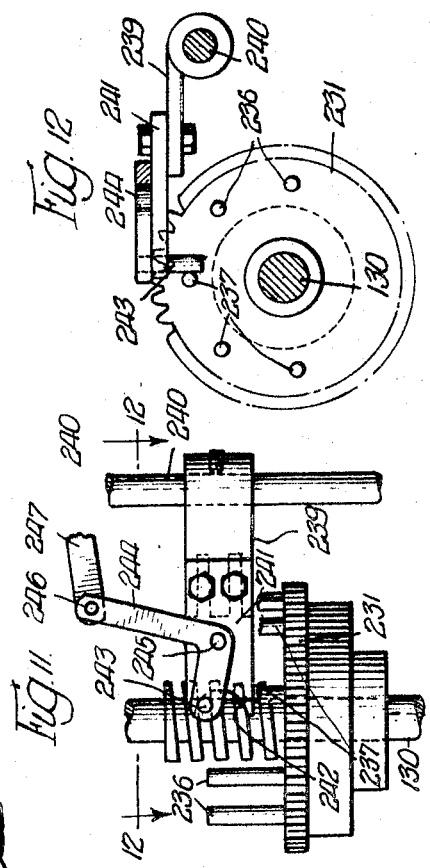

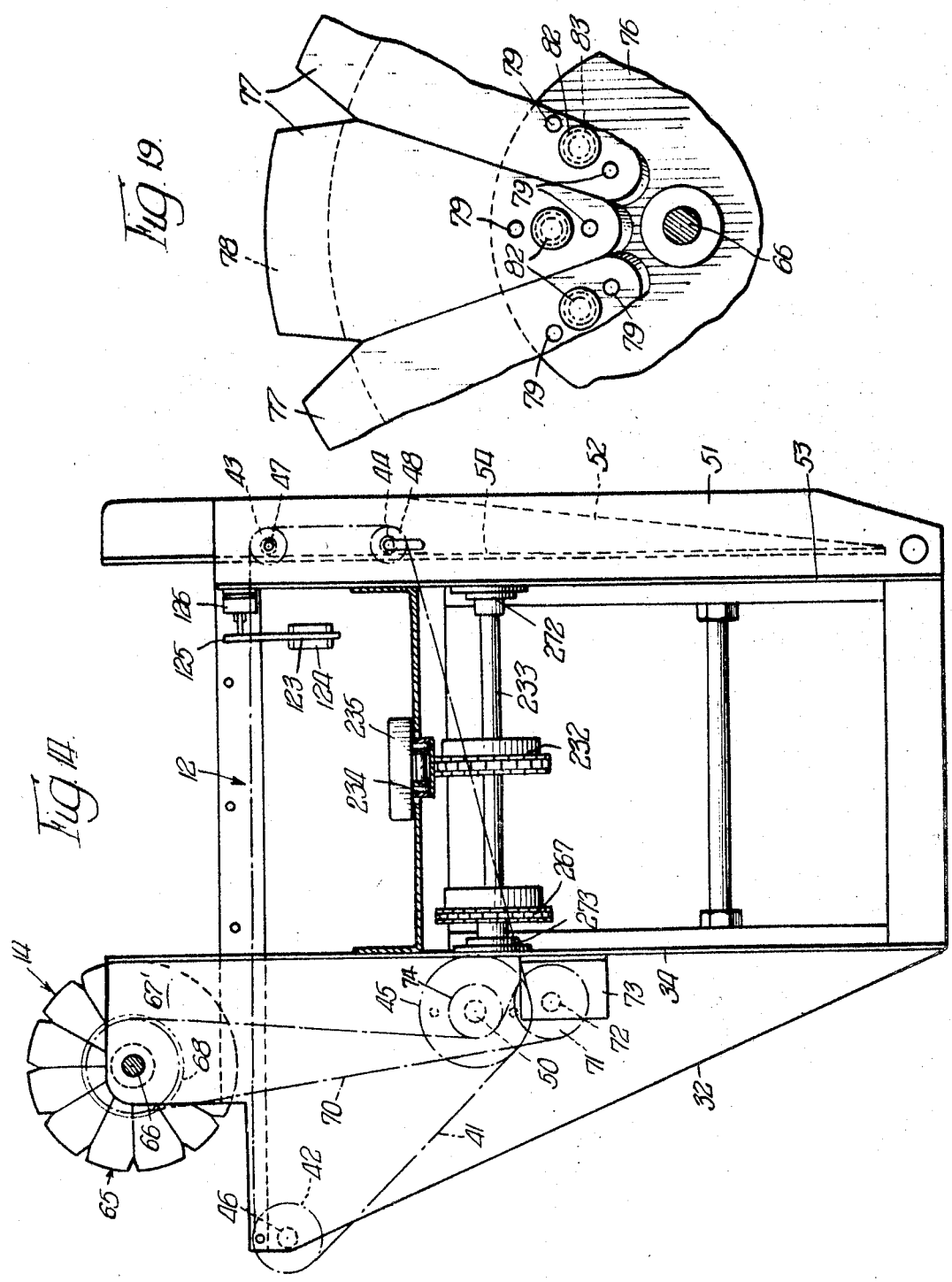

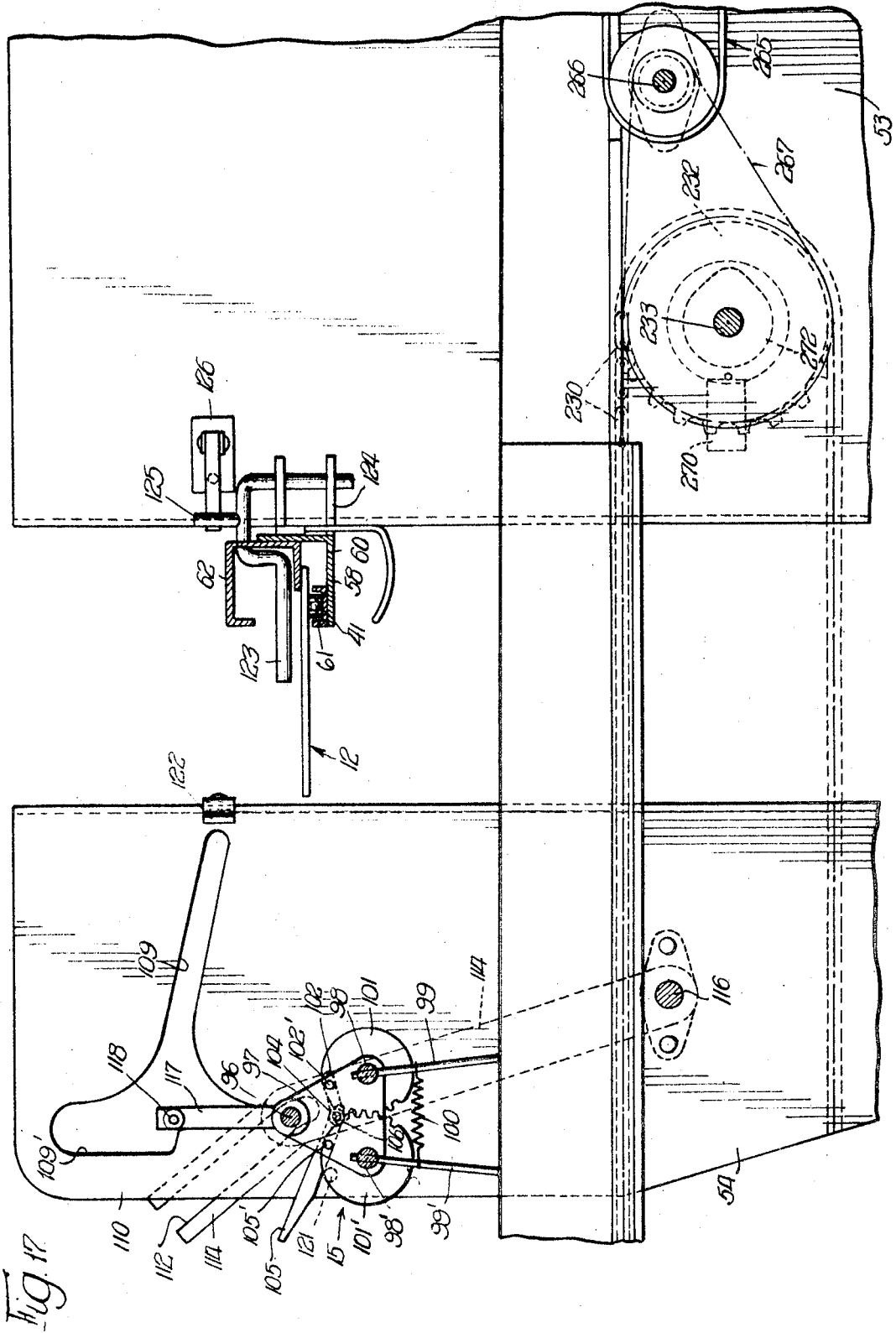

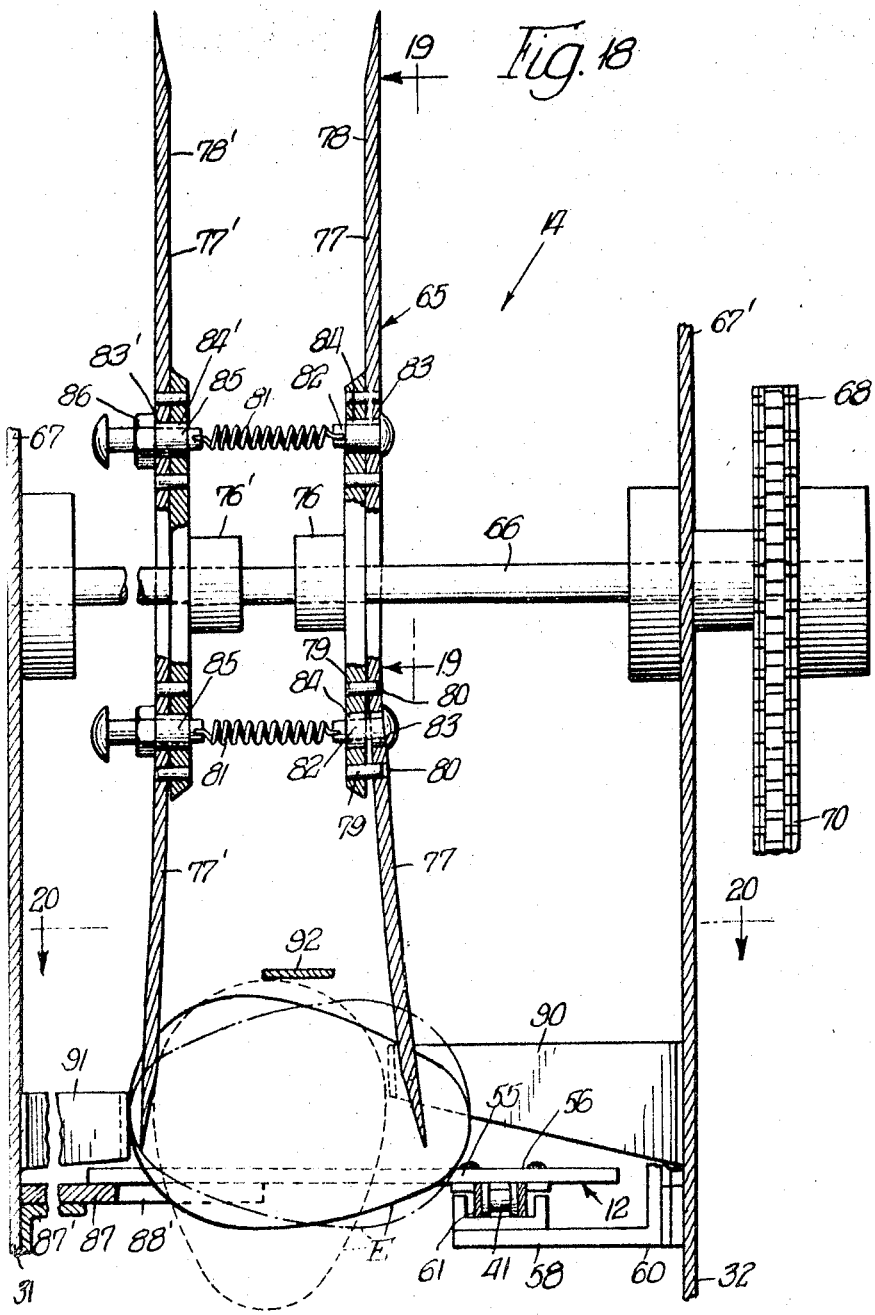

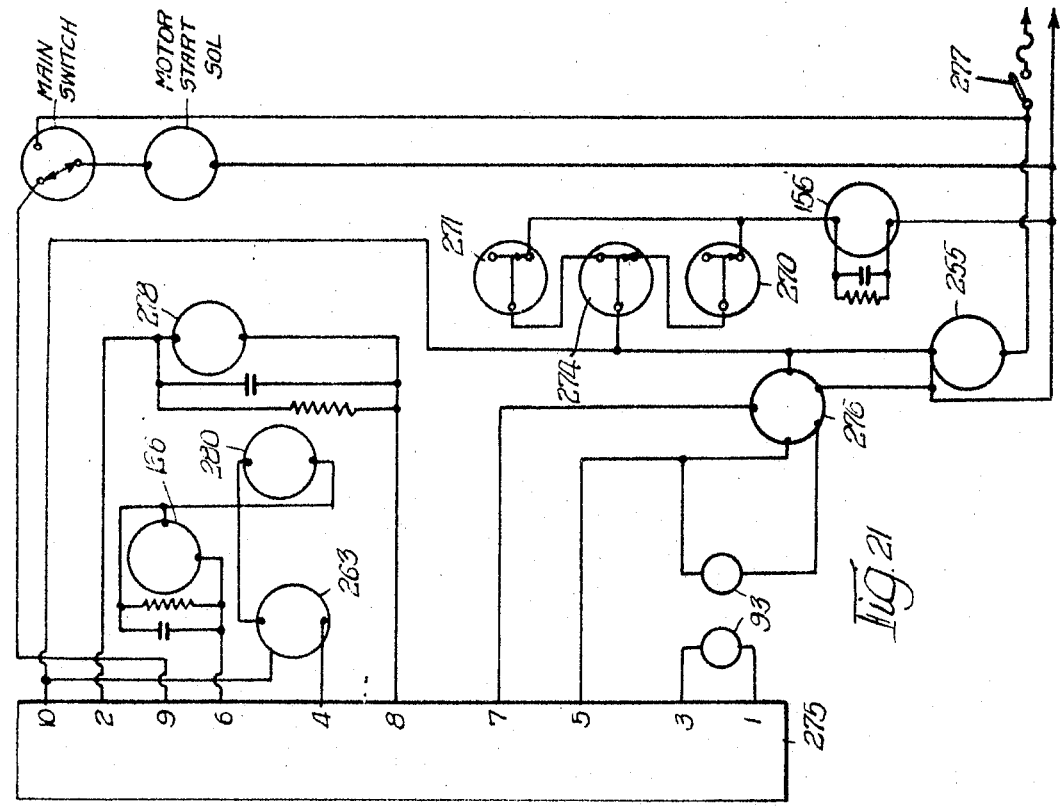
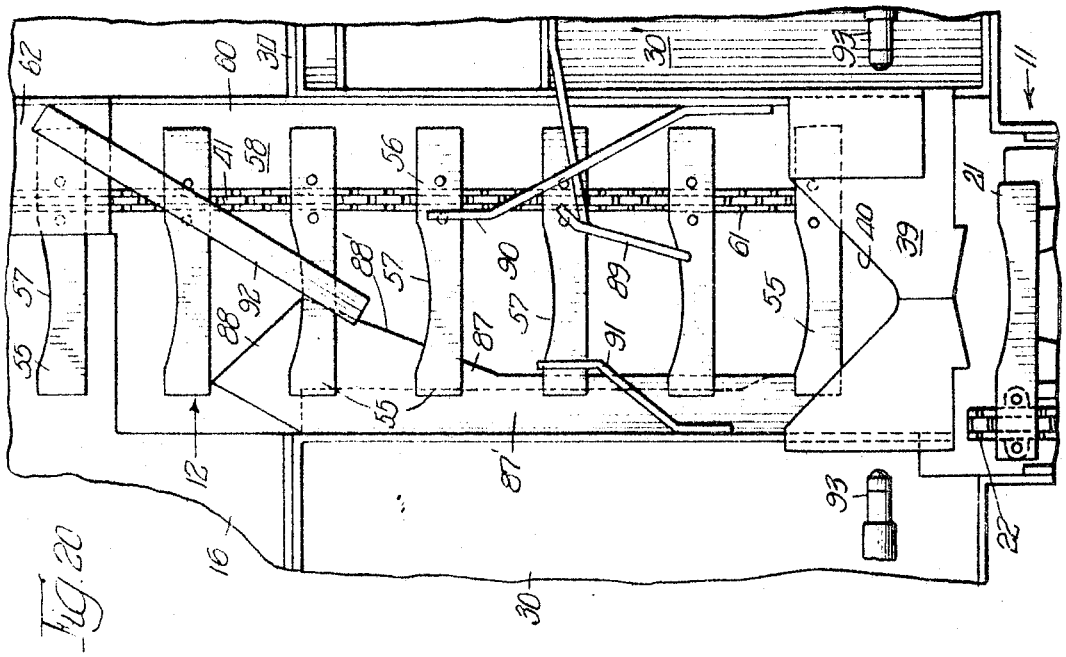

3,461,459
EGG HANDLING EQUIPMENT
Charles H. Willsey, Topeka, and Francis W. Majors, Ozawkie, Kans., assignors, by mesne assignments, to Seymour Foods, Inc., Topeka, Kans., a corporation of Delaware
Filed Oct. 18, 1965, Ser. No. 497,242
Int. Cl. B65b 23/06, 57/14, 43/44
U.S. Cl. 53—55                    15 Claims

ABSTRACT OF THE DISCLOSURE

An apparatus for packing eggs in cartons or filler flats which is characterized by a single line conveyor having pocket forming means spaced longitudinally for supporting, with their axes extending transversely of the conveyor path, eggs which are delivered to the conveyor in random arrangement, an orienting device in the form of spaced discs rotatably mounted above the top run of the conveyor for co-operation therewith to orient the eggs, so as to bring the small end of each egg to the same side of the conveyor, a container dispenser which is adjustable to feed either open cartons or filler flats onto the top run of a packing conveyor which operates in a path extending transversely of the path of the egg supporting conveyor and a transfer device mounted on a swinging frame which is operative to pick up successive rows of six eggs each on the egg supporting conveyor and deposit the same in the pockets of a carton or filler flat on the packing conveyor. The apparatus has electrical controls which provide for automatic operation and which insures that full rows of eggs are transferred to the containers from the egg supporting conveyor.

---

This invention relates to apparatus for handling articles and is more particularly concerned with improvements in apparatus for arranging articles in predetermined relation in a row and transferring the articles in successive groups of a predetermined number to cellular cartons or similar containers or receptacles.

It is a general object of the invention to provide improved conveying and transfer apparatus for receiving articles, such as eggs, in random arrangement, and for arranging the same in predetermined relation on a traveling conveyor from which they are transferred in groups or rows of a predetermined number to packing receptacles, such as, cellular cartons, filler flats or the like so that the eggs are arranged each in a predetermined position in the cells or pockets provided therefor in the packing receptacles.

It is a more specific object of the invention to provide conveyor apparatus and associated mechanism for receiving eggs in random arrangement, for arranging the eggs in predetermined relation on a pocketed conveyor and for transferring successive row forming groups of the eggs from the conveyor to the cells or pockets of a cellular egg carton or a filler flat which is positioned at a packing station to receive the same.

It is a further object of the invention to provide apparatus for supplying eggs to the pockets of an endless traveling conveyor, for arranging the eggs in predetermined position in the pockets of the conveyor, for feeding cellular egg cartons or filler flats to a packing station and for transferring successive rows or groups of eggs of a uniform number from the pockets of the conveyor to the packing station and depositing the same in predetermined position in the pockets of the carton or filler flats.

It is a still further object of the invention to provide an apparatus for delivering eggs from a supply thereof where they are in random arrangement to a traveling conveyor having pockets for receiving the eggs in single file arrangement and an egg orienting device associated with the conveyor for turning each successive egg in the conveyor pocket so that it is positioned with its long axis in a generally horizontal plane and with the small end of each egg pointing in the same direction.

It is another object of the invention to provide an egg orienting and packing apparatus adapted to receive eggs in random arrangement wherein an egg orienting device is provided which arranges the eggs, with their long axis in a generally horizontal plane, in spaced, single file relation on an endless traveling conveyor from which the eggs are transferred in groups or rows of a predetermined number to a cellular carton or a filler flat in which the eggs are deposited in row formation with their small ends down and wherein a magazine and associated mechanism is provided for feeding from a stack either cellular cartons or filler flats with provision for rapid changeover from one to the other type of packing receptacle.

It is a further object of the invention to provide in an egg handling apparatus mechanism for receiving eggs in random arrangement and for feeding them to a pocketed conveyor with their long axes disposed generally horizontal, together with mechanism for spacing the eggs in pockets on the conveyor and mechanism for orienting the eggs in the pockets so that they have their long axis disposed in a generally horizontal plane with the larger end of each egg in the same position relative to the longitudinal center of the conveyor, the orienting apparatus including means to tilt successive eggs so as to pivot each egg in its pocket and position the eggs on the conveyor in a uniform manner and in a single line.

It is still another object of the invention to provide apparatus for receiving eggs in random arrangement and for orienting the eggs so as to enable groups thereof to be transferred from a traveling conveyor to a cellular carton or a pocketed filler flat at a packing station with the machine being adapted to operate automatically to position the eggs on the conveyor and to deposit the groups thereof in successive cartons or filler flats which are automatically fed from a stack in timed relation to the operation of the egg transfer device.

It is another object of the invention to provide an egg handling apparatus having mechanism for receiving eggs in random arrangement, for arranging the eggs in uniform position and single file relation on an endless traveling conveyor, for transferring the eggs in groups of a predetermined number to a packing station for deposit in a cellular carton or a pocketed filler flat member wherein provision is made for feeding cellular cartons or filler flats from a supply magazine to the packing station with the mechanism for feeding the cartons or the filler flats adapted to be adjusted to handle either type of receptacle with a minimum loss of time in changing from one to the other.

It is another object of the invention to provide conveyor apparatus for receiving articles of ovoid shape in random arrangement and for orienting the articles so as to arrange the articles in the same position on the conveyor and to enable the articles to be transferred in groups of a predetermined number to a packing receptacle at a packing station with the machine being adapted to operate automatically to orient the articles on the conveyor and to deposit the groups thereof in successive receptacles which are automatically fed from a stack in timed relation to the operation of the transfer device.

These and other objects and advantages of the invention will be apparent from a consideration of the egg handling apparatus which is shown by way of illustration in the accompanying drawings wherein:

FIGURE 1 is a side elevation, with portions broken away or omitted, of an egg packing machine which incorporates therein the principal features of the invention;

FIGURES 2 and 2A constitute a plan view of the machine, to a larger scale and with portions thereof broken away or omitted;

FIGURE 3 is an end elevation of the machine of FIGURE 1 at the container magazine end thereof;

FIGURE 4 is a cross section taken on the line 4—4 of FIGURE 2;

FIGURE 5 is a fragmentary longitudinal, vertical section taken on the line 5—5 of FIGURE 2, to a larger scale;

FIGURE 6 is a partial plan view taken on the line 6—6 of FIGURE 5;

FIGURE 7 is a fragmentary section taken on the line 7—7 of FIGURE 5;

FIGURE 8 is a partial side elevation, the view being taken on the line 8—8 of FIGURE 2;

FIGURE 9 is a cross section taken on the line 9—9 of FIGURE 2;

FIGURE 11 is a fragmentary view taken on the line 11—11 of FIGURE 1, to an enlarged scale;

FIGURE 12 is a fragmentary, longitudinal, vertical section taken on the line 12—12 of FIGURE 11;

FIGURE 13 is a fragmentary, longitudinal, vertical section taken on the line 13—13 of FIGURE 2, to a larger scale;

FIGURE 14 is a cross section taken on the line 14—14 of FIGURE 2A;

FIGURE 15 is a cross section taken on the line 15—15 of FIGURE 2A;

FIGURE 16 is a fragmentary side elevation, the view being taken on the line 16—16 of FIGURE 2A;

FIGURE 17 is a longitudinal vertical section taken on the line 17—17 of FIGURE 2A to a larger scale;

FIGURE 18 is a fragmentary, vertical section taken on the line 18—18 of FIGURE 2A, to a larger scale;

FIGURE 19 is a fragmentary, elevational view taken on the line 19—19 of FIGURE 18;

FIGURE 20 is a fragmentary, sectional view taken on the line 20—20 of FIGURE 18; and FIGURE 21 is a largely schematic wiring diagram showing the electrical controls for the machine.

Figure 10:
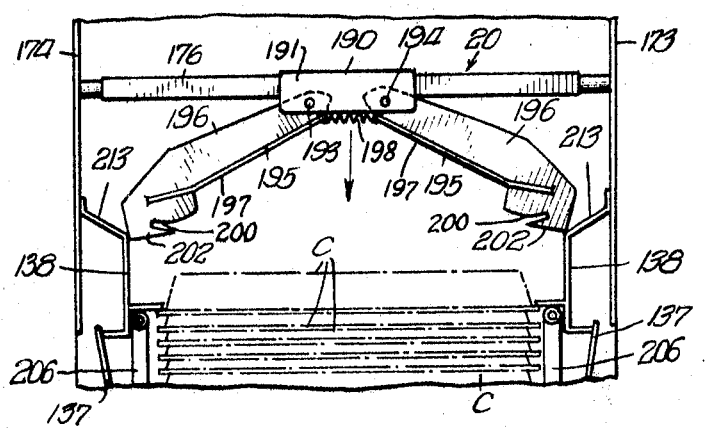
FIGURES 10, 10A, 10B and 10C are fragmentary plan views showing successive positions of the container dispensing head and associated members in withdrawing the leading container from a stack in the container supply magazine.

Referring first to FIGURES 1, 2 and 2A of the drawings, there is illustrated an article handling machine which is particularly designed for arranging eggs, which are delivered to the machine one by one from an infeed conveyor, in predetermined, spaced relation, on a single line endless traveling conveyor with the individual eggs each having the long axis generally horizontal and the small end of each egg pointing in the same direction, which conveyor advances the eggs to a transfer station where successive groups of the eggs, of a predetermined number, are removed from the conveyor by a transfer device and deposited in a cellular carton or a filler flat which is dispensed from a supply magazine and advanced on a traveling conveyor to the transfer station. The machine includes a supply magazine and a dispensing head which is adapted to handle cellular egg cartons or pocketed filler flats, both of well known construction. The eggs E are fed to the machine by an infeed conveyor mechanism 11 which positions them on a traveling conveyor 12 where they pass beneath an orienting mechanism 14. The orienting mechanism 14 arranges the eggs in single file on the conveyor 12 with their small ends pointing in the same direction. The eggs are removed from the conveyor 12 in groups of six by a transfer device 15 and deposited in a cellular container which, as illustrated, is a molded paperboard carton, of well known construction, adapted to receive two rows of six eggs each. The carton C is advanced to a transfer or packing station, beneath the transfer device 15, on a table 16, by a forwarding conveyor 17, from a magazine 18 at the end of the table 16. The magazine 18 holds a stack of nested cartons C arranged in vertically disposed, on-edge relation. The cartons C are withdrawn from the end of the stack at the end of the magazine by a dispensing head mechanism indicated at 20.

The eggs E are delivered to the infeed assembly 11 from a supply source by a conveyor (not shown) which deposits the eggs in random arrangement on a short single line infeed conveyor 21 (FIGURES 2A, 3, and 20). The infeed conveyor 21 comprises an endless chain 22 supported on a pair of spaced sprockets 23 and 24 mounted on cross shafts 25 and 26 which are journaled at their opposite ends in parallel, vertically disposed, laterally spaced side plates 27 and 27' constituting a supporting frame which is connected by angle brackets 28 and 28' to the end walls of a pair of spaced rectangular trays 30 and 30' supported at the upper edges of vertically disposed, spaced, parallel, triangular-shaped frame plates 31 and 32 (FIGURE 1) extending from side wall plates 33 and 34 at one side of the main frame assembly 35. The one shaft 25 may be driven by chain and sprocket connection with a motor indicated at 36 (FIGURE 3). The chain 22 carries a series of longitudinally spaced, laterally extending plate members 37 (FIGURE 2A) each having a forward or leading edge cut on a curve 38 and co-operating with the preceding plate member 37 to form an egg receiving pocket on the top run of the conveyor, the eggs being carried between successive pairs of plates 37 with their long axes generally horizontal. The pocket forming plates 37 are each bolted or otherwise secured at one end to the chain 22 so that they extend in a generally horizontal plane as they traverse the top run thereof. A plate 39 is supported in forwardly and downwardly inclined position at the forward end of the top run of the conveyor 21 so as to form a chute between the conveyors. The plate 39 is bent so as to have a transverse cross section of generally V shape and its forwardmost edge is cut on a V at 40 so that the eggs advanced by the conveyor 21 roll across the inclined plate 39 and down onto the top run of an endless traveling orienting conveyor 12 disposed below the orienting mechanism 14. The chute forming inclined plate 39 which transfers the eggs from the conveyor 21 to the conveyor 12 is supported between the opposed inner edges of the trays 30 and 30'.

The conveyor 12 (FIGURES 2A 14, 16, 17 and 20) comprises an endless chain 41 supported on the sprockets 42, 43, 44 and 45, the two uppermost sprockets 42 and 43 being aligned so that the top run of the chain 41 is in a generally horizontal plane. The sprockets 42, 43 and 44 are mounted on parallel, spaced idler shafts 46, 47 and 48, while sprocket 45 is mounted on a longitudinally extending drive shaft 50 which is operated from the main drive shaft for the machine. The shaft 46 is journaled in the frame plates 31 and 32. The shafts 47 and 48 are journaled in parallel, outwardly extending, vertically disposed flanges 51 and 52 of longitudinally extending frame side plates 53 and 54 at the opposite side of the machine. The endless conveyor chain 41 carries a series of spaced, parallel egg support plates 55, each of which has one end bolted or otherwise secured at 56 to the chain 41 so that it extends in a generally horizontal plane. Each plate 55 has its forward edge cut on a curve 57 so as to co-operate with the preceding plate in forming a pocket for an egg. The curved edge 57 permits the egg to pivot or turn about its short axis so that it may be rotated as hereinafter described to reverse the position of its small and large ends and enable the eggs to be arranged in uniform position on the conveyor. The top run of the chain 41 is supported on the horizontally disposed flange 58 of an elongate angle bar 60 which has a guide channel 61 mounted on the upper face thereof so as to provide a track for chain 41. A top guard rail or cover plate 62 extends from a point beyond the orienting apparatus 14 across the end of the packing table 16.

The egg orienting apparatus 14 (FIGURES 1, 2A, 3, 14, 16, 18, 19 and 20) operates to insure that each successive egg which is delivered to the entrance end of the conveyor 12 is positioned with its long axis generally horizontal and its smaller end disposed on the right as indicated in solid line in FIGURE 18 or it is flipped over to that position if it is fed to the orienter in the position indicated by phantom line in FIGURE 18. This apparatus comprises a wheel assembly 65 which is mounted on a shaft 66 journaled in upstanding, parallel plate members 67 and 67' integral with the plate flanges 31 and 32. Shaft 66 carries a sprocket 68 (FIGURES 1, 14 and 18) which by a drive chain 70 with the sprocket 71 on a small stub shaft 72 supported on the bearing bracket 73. The drive chain 70 engages a drive sprocket 74 on the longitudinally extending drive shaft 50. The cross shaft 66 (FIGURES 18 and 19) carries a pair of axially spaced hub formations 76 and 76' and each of the hub formations supports a series of radially extending plates 77 and 77' of generally triangular shape which are arranged in paired relation and which have their outer ends beveled at 78 and 78', the beveled portions of each pair thereof facing inwardly in opposed relation to each other. Each of the plates 77 and 77' is mounted in an identical manner on its respective hub formation. Each plate 77 and 77' is mounted on a pair of radially spaced pins 79 on hub 76 or 76' which are slidable in bores 80 in the plate member so that the plate is free to pivot somewhat in a direction outwardly away from the center of the wheel. The plates 77 and 77' are arranged in paired relation with the plates of each pair thereof opposite each other and urged towards each other by a tension spring 81 which is connected at one end to the shank end of a headed pin 82. The pin 82 extends through aligned bores 83 and 84 in plate 77 and hub member 76, respectively, with sufficient clearance or loose fit to permit pivoting movement of the plate member 77 about its inner end. The other end of spring 81 is connected to the inner end of the shank of a threaded stud bolt 85 which has a loose fit in aligned bores 83' and 84' in plate 77' and hub 76', respectively. The bolt 85 carries an adjusting nut 86 which can be turned to vary the tension in the spring 81. The two sets of plates 77 and 77' are axially spaced a distance somewhat less than the long dimension of an egg and the wheel assembly 65 is spaced above the conveyor 12 and timed relative to the conveyor 12 so that when it rotates and eggs are carried beneath the same by the conveyor 12, the beveled ends 78 and 78' rotate in a path where the ends of each pair of plates will normally engage an egg in a pocket of the conveyor 12 adjacent both ends, indicated in FIGURE 18. The difference in the curvature of the egg surface near the small and large ends is substantial and this difference in surface contour results in pivoting of the egg in the pocket of the conveyor in a predetermined manner when it is engaged by the plates 77 and 77'. When the end of a plate 77 or 77' engages the top of an egg near the smaller end of the egg, it exerts a substantial amount of pressure tending to pivot the egg about its short horizontal axis so as to swing the small end of the egg downwardly in the pocket of the conveyor. When the end of the plate 77 or 77' engages the top surface of the egg adjacent the large end thereof, less pressure is exerted on the egg because of the larger diameter of the surface and the egg tends to slide upwardly along the beveled inside edge of the plate thereby yielding to the greater pressure applied by the oppositely disposed plate which engages at the same time the egg surface adjacent the smaller end thereof. Each pair of plates acting on an egg by reason of the timing of the rotation of the shaft 66 relative to the advance of the conveyor 12 will tend to rotate the egg in the conveyor pocket so as to bring the egg into the position indicated in dotted line in FIGURE 18 with the small end on the bottom.

The egg carrying plates 55 on the conveyor 12 are supported at their free ends as they move beneath the orienting wheel assembly 65 on the guideway forming edge of a horizontally disposed plate member 87 (FIGURES 1, 18 and 20) which is mounted by means of the angle bracket 87' on the frame member 31. The plate member 87 which is preferably of plastic or similar material is formed with a leading end portion 88 (FIGURE 20) shaped so as to provide an inside edge 88' which extends diagonally into the path of the eggs on the conveyor 12. The plate edge 88' is positioned to engage with the smaller ends of the eggs below the conveyor pockets and to insure that each successive egg is tilted to a position where the long axis of each egg is horizontal and the small end points to the right as shown in solid line in FIGURE 18. Three guides or guard members 89, 90 and 91, which may be formed of spring plate material or spring wire, properly bent into the positions shown, are arranged immediately above the top run of the conveyor 12 and tend to center the eggs on the conveyor as they approach and leave the orienting wheel assembly 65. A spring wire or spring plate guard member 92 is disposed at the exit side of the orienting wheel assembly 65 in a position to engage the tops of the eggs in the conveyor 12 so as to hold the eggs in the pockets of the conveyor 12 and insure effective operation of the plate edge 88' in turning the small ends of the eggs in the same direction. A pair of electric eye devices 93 are arranged at the entrance end of the conveyor 12 for sensing eggs which are delivered to the conveyor. The electric eye 93 is incorporated in a control circuit (FIGURE 21) for operating the machine so as to insure that each successive pocket on the conveyor 12 is supplied with an egg and that the conveyor will be stopped if there is a failure in the feed of the eggs.

The eggs are transferred in groups of six from the conveyor 12 to either a cellular carton or a pocketed filler flat which is dispensed from the magazine 18 by dispensing head 20 and advanced across the table 16 by conveyor 17 to a packing or transfer station beneath the swinging transfer mechanism 15. The transfer mechanism 15 comprises a frame 95 (FIGURES 1, 2A, 15, 16 and 17) mounted for swinging movement at the one side of the conveyor 12. The transfer frame 95 comprises a main frame rod 96 having a pair of axially spaced, triangular shaped end plates 97 and 97' with a pair of finger carrying rods 98 and 98' journaled in the end plates and provided with pairs of co-operating egg engaging and gripping fingers 99 and 99' mounted in axially spaced relation along the length thereof. Tension springs 100 extend between the two sets of fingers 99 and 99' which urge the fingers of each pair thereof toward each other and in the direction of egg gripping position. The finger carrying rods 98 and 98' are extended at one end beyond the end plate member 97 and provided with interengaging segments 101 and 101' (FIGURE 17) which are fixed thereon so that the rods rotate or turn about their axes in unison and in opposite directions. The two segments 101 and 101' are connected by an operating linkage (FIGURES 2A, 16 and 17) which consists of a short link 102 mounted at one end on a pivot pin 102' on the one segment 101 and connected at the other end by pivot 104 with the end of an operating arm or lever 105 which is pivoted at 105' on the other segment 101'. A cam operated closing roller 106 is mounted on the outer end of pivot 104 and the linkage formed by the two members 102 and 105 is arranged so that the pivot 104 may be moved across dead center in rotating the gripper carrying rods 98 and 98' and whereby the gripper fingers 99 and 99' are held in either open or closed position by the action of springs 100. The main frame bar 96 is extended at its ends so as to ride in an inverted L-shaped cam slot 107 (FIGURE 1) in the upper end portion 108 of the vertical side plate 33 and the T-shaped cam slot 109 (FIGURES 16 and 17) in the upper end portion 110 of the vertical side plate member 54. The plate portions 108 and 110 are parallel and extend above the conveyor table 16 on the top of the main frame 35 of the machine. The bar 96 has its ends seated in elongate slots 111 and 112 in the ends of operating arms 113 and 114 which are pivoted at 115 and 116 on plate portions 108 and 110 below cam slots 107 and 109. The rod 96 carries an arm 117 at the end thereof which is adjacent the plate portion 110 having a pin 118 which extends into the uppermost portion 109' of the cam slot 109 and forms part of the control for turning the transfer frame 95 or holding it in the desired path at one end of its swinging movement. The transfer frame 95 is swung between its egg gripping position where the fingers 99 and 99' are in a horizontal position and an egg discharge position where the fingers 99 and 99' are in a vertical position by a pitman 120 which is pivotally connected at 119 (FIGURE 16) to the one operating arm 114 and reciprocated by a mechanism hereinafter described. Side plate 110 is provided with a cam roller 121 (FIGURE 17) on its inside face which is positioned for opening the egg gripping fingers 99 and 99' by engagement therewith of the free end of lever arm 105 at the end of the movement of transfer frame 95 to the egg depositing position with the fingers 99 and 99' disposed vertically. A cam plate 122 is also mounted on plate 110 at the proper location for engaging the finger closing roller 106 when frame 95 is swung to position the fingers 99 and 99' horizontally and advanced toward the conveyor 12 for picking up the row of eggs from the conveyor 12 so as to close the fingers 99 and 99' for gripping the eggs at the end of their horizontal movement which is controlled by the generally horizontal portions of the cam slots 107 and 109. The swinging movement of transfer frame 95 is initiated by a switch operating arm or finger member 123 (FIGURES 2A, 14 and 17) which projects into the path of the line of eggs on conveyor 12 and which is engaged by the leading egg when six eggs have been advanced to transfer position by conveyor 12. The switch tripping arm 123 is generally L-shaped with one leg pivotally mounted in the U-shaped bracket 124 which is secured on the upstanding flange of angle member 58, the latter supporting the chain 41. An upstanding pin 125 on the arm 123 engages the operating arm of a solenoid switch 126. Switch 126 is connected into the electrical control circuit (FIGURE 21) so as to operate the dog 127 through solenoid 127' (FIGURE 8). The dog 127 is pivoted at 128 on the main frame and has its hooked end spring urged against the notched periphery of circular plate 129 on the end of the main power shaft 130 for the machine. The pitman 120 is pivoted at 131 to the face of the plate 129 in radial spaced relation to the axis of the shaft 130. The plate 129 is connected to the shaft 130 by a slip clutch so that it rotates when the dog 127 is swung by operation of the solenoid to release position.

The egg cartons or filler flats C are supplied from the magazine 18 (FIGURES 1 to 8) which is mounted at one end of the main frame 35 of the machine. The magazine 18 comprises a bottom supporting plate 132 on which a stack of the cartons or filler flats are supported on edge and in nested relation. The bottom plate 132 extends between upright, oppositely disposed, parallel side frame plates 133 and 133' above which side frames are disposed in upright parallel planes which co-operate with the bottom plate to hold the supply of containers in stack formation. These side frames comprise longitudinally spaced, vertically extending post forming members 134, 134' and 135, 135' arranged in paired relation at the rearward and forward ends of the magazine 18 and connected by longitudinally extending, narrow side frame bars 136, 136'. The forward posts 135, 135' which are adjustably mounted by bolt and slot connections on the vertical side frame members, are extended upwardly and carry pairs of vertically spaced spring plate members 137 and associated gripping and feeding devices or assemblies 138 which co-operate with the container dispensing head 20 in feeding successive end containers from the forward end of the stack. The spring plate members 137 and the associated container gripping and feeding devices 138 are of identical construction and are arranged in vertically spaced, paired relation on each side of the magazine. The receptacles or containers in the stack are advanced toward the dispensing head or container feeding device 20 by elongate, stack supporting bars or shoe forming members 140 and 140' (FIGURES 5 and 6) which are disposed in longitudinally extending recesses 141 and 141' in the bottom plate 132, the recesses 141 and 141' being rectangular in cross section and having a depth sufficient to permit a four motion movement of the shoe members 140 and 140'. The latter are mounted at their opposite ends on eccentrics 142 and 142' by means of upstanding angle brackets 143 and 143'. The eccentrics 142 and 142' are carried on longitudinally spaced cross shafts 144 and 145, both of which are journaled in the side frame plates 133 and 133'. The stack forwarding shoes or bars 140 and 140' are given a four motion movement by rotation of the eccentrics 142 and 142', the top surface of the bars being slightly above the surface of the floor forming bottom member 132 during forward motion of the same and being slightly below the top surface of the member 132 during rearward motion thereof so as to slightly lift the stack of containers and give it a forward movement at intervals. The two cross shafts 144 and 145 are connected for simultaneous rotation by longitudinally extending chain 146 which engages sprockets 147 and 148 fixed on the shafts 144 and 145, respectively. The shaft 144 is connected to the main power shaft 130 by chain 151 which engages sprocket 152 fixed on the drive shaft 130 and sprocket 153 which is connected by a slip clutch 154 with the shaft 144 so as to insure that there is only one way rotation of the shaft 144. The shaft 144 is extended at the one end and provided with a notched disc 155 adapted to be engaged by a dog 156 controlled by a solenoid indicated at 156' serving to lock the shaft 144 against rotation when engaged in the notch in the disc 155. At the other end of the shaft 144 a lever arm 157 is mounted which is pivotally connected at 158 with the end of a pitman 160 for operating the container dispensing device 20.

A pressure applying pusher assembly 165 (FIGURES 3 and 4) is mounted on the magazine 18 for engaging the trailing end of the stack of containers. The stack pusher 165 comprises a cross plate 166 of generally channel-shaped section with its opposite ends connected to slides 167, 167' each having a guideway forming groove 168, 168' on the outer face thereof and seated in sliding relation on the longitudinally extending side frame members 136 and 136'. The cross plate 166 carries a pair of laterally spaced, vertically disposed, parallel rods 170 and 170' which extend in sliding relation through vertically aligned apertures in the rearwardly extending top and bottom flanges of the plate 166. The rods 170 and 170' carry on their bottom ends friction pad members 171 and 171' which engage on the top surfaces of the shoe forming bars 140 and 140' and which are urged against the same by compression springs 172 and 172' extending between the tops of the pads 171 and 171' and the bottom faces of the bottom flange of plate 166. The compression in the springs 172 and 172' and the height of the pads or feet 171 and 171' is adjusted so that the four motion movement of the stack forwarding shoes 140 and 140' imparts a forward movement to the pusher assembly 165 sufficient to apply substantially constant pressure on the trailing end of the stack of containers so as to keep the stack moving forward. The pusher assembly 165 also tends to square up the front of the stack. However, the magazine may be provided with spring fingers (not shown) at the bottom of the front portion of the stack for this purpose. The stack is, of course, moved forward so as to maintain the leading container in the stack in a predetermined position for removal therefrom by the dispensing device 20 which desposits each successive container on the conveyor table 16 in front of the stack for forwarding by the conveyor 17.

The container dispensing device or head assembly 20 (FIGURES 1, 2, 5, 6, 9 and 10) is supported on vertically disposed, parallel side plates 173 and 174 mounted on the outside faces of the main frame 35 at the forward end of the magazine 18 and the trailing end of the conveyor table 16. The assembly 20 is adapted to withdraw from the magazine 18 and deposit on the end of the conveyor table 16 successive end containers in the supply stack which is supported in the magazine 18. The assembly 20 is so constructed that it will withdraw the leading carton from a stack of cartons or the leading filler flat from a stack of filler flats and deposit the carton or filler flat, as the case may be, on the conveyor table 16. The assembly 20 comprises a supporting frame structure 175 (FIGURES 6, 9 and 10) which includes a main cross bar 176 having one end extended through an L-shaped cam slot 177 (FIGURE 8) in the side plate 174 and its other end extended through a T-shaped cam slot 178 (FIGURE 1) in the side plate 173. The bar 176 also extends at its ends through open ended slots 180 and 181 in the outer ends of arms 182 and 183 which are pivotally mounted at 184 and 185 to the support plates 173 and 174, respectively, so that swinging movement of the arms 182 and 183 will move the dispensing assembly 20 in a path determined by the cam slots 177 and 178. The cam slot 178 corresponds to a portion of the cam slot 177 so that there is uniform movement of the ends of the cross frame rod 176. The one arm 182 has a bracket 186 which is pivotally connected at 187 to the end of the pitman 160 so that movement of the assembly 20 is controlled by rotation of the cross shaft 144. The cross rod 176 (FIGURES 2, 6, 8, 9 and 10) has adjustably mounted thereon by means of thumb screw 188 and slot 189 a rectangular center plate 190 which is disposed so that when the assembly 20 is in position for gripping a container at end of the stack, the center plate 190 is in a generally vertical position and the top and bottom flanges 191 and 192 extend in the direction of the stack. A pair of pivot pins 193 and 194 extend in parallel relation through vertically aligned apertures in the outer corners of the top and bottom flanges 191 and 192 and provide pivot supports for four arm assemblies 195 which are of identical construction and which are mounted in an identical manner on the pivot pins 193 and 194. Each arm assembly 195 comprises a plate member 196 of the configuration shown in FIGURES 9 and 10 with a reinforcing or stiffening flange 197, as shown, which gives the main body of the arm in cross section, a T configuration. The arm assembles 195 are disposed in paired relation at the top and bottom margins of the supporting plate 190 and inside the flanges 191 and 192 as shown in FIGURE 10. A tension spring 198 is connected between the inner ends of the flanges 197 of each pair of arms 195 and urges the same toward each other and into container gripping position. The plate 196 is provided at its free ends with a curved slot 200 opening inwardly in the direction of longitudinal center of the machine. The slot 200 is formed between a curved forward edge portion 201 of the plate 196 at the end of the arm and a small plate 202 having an inner portion overlying part of the curved edge portion 201, the plate 202 being in a plane transverse of the plane of the plate 196. The plate 202 which forms a hook-like member on the end of the arm 195 is of generally triangular shape as shown in FIGURE 6 and is spaced from the curved edge portion 201 of plate 196 so as to provide slot 200 with somewhat greater width than the thickness of the material at the side edge or rim of the container C.

The container dispensing head 20 is moved by mechanism heretofore described so as to engage the ends of the arms 195 with successive end containers in the dispensing end of the stack and to withdraw each successive end container from the stack and deposit the same on the conveyor table 16 for advance by the conveyor 17 to the container packing or loading station beneath the transfer device 15. As the head 20 is moved toward the end of the stack for gripping and withdrawing a container, the arm assemblies 195 on opposite sides are spread apart or opened so as to engage the ends of the arms with the side margins of the end container, the ends of the plates 196 being guided by engagement with the end plate members 203 of the stack holding devices or assemblies 138. As shown in FIGURES 5 and 6, the assemblies 138 are of like construction and each end plate member 203 of each assembly 138 comprises a straight strip-like portion 204, disposed in generally vertical position, and, in the stack gripping or holding position of FIGURE 6, generally parallel with the longitudinal center of the magazine 18. A vertical pivot 205 connects the one end of the straight portion 204 with the end of a link bar 206 which has its other end pivoted at 207 to the end of a horizontally disposed slide bar member 208 (FIGURES 5, 6 and 7) which is mounted in free sliding relation in a guideway 210 formed on the outside face of the associated upright side frame post 135 or 135'. The straight portion 204 terminates at the end adjacent the stack in an outwardly directed flange forming member 211 which engages the inner face of the associated flat spring member 137 adjacent the free end thereof, the latter being secured at its trailing end on the vertical support post 135 or 135' and being adapted to urge the trailing end of the plate member 203 in the direction of the containers in the stack so as to normally position an inwardly extending flange or spade member 212 on the other side of the plate portion 204 into container restraining or holding position where it is in engagement with the marginal edge of a leading container stack. The end of the plate member 203 which extends forwardly of the stack end, as viewed in FIGURE 6, is bent outwardly to provide a diagonal portion 213 with a bent terminal end 214 which engages in sliding relation with the inside face of the adjacent vertical plate member 173 or 174.

Figure 10A:
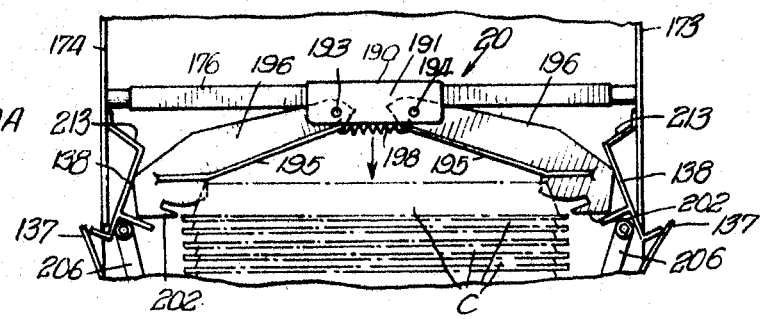
Figure 10B:
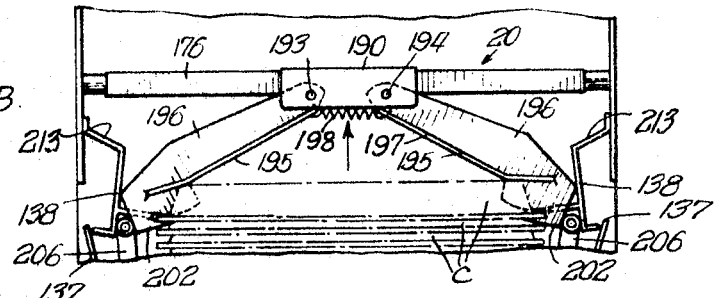

When the dispensing head 20 is moved toward the stack of containers the free ends of the arms 195 engage first with the diagonal portions 213 of the assemblies 138 and the arms of each pair thereof are forced inwardly toward each other. As the arms 195 are advanced toward the stack the ends of the plates 196 slide along the inside faces of the plate portions 213 and 204 and as the movement continues, plate members 203 are pivoted about the free end portions 214 in an outward direction which moves the spade member 212 to a position to release the stack of containers (FIGURE 10A) with the curved end edges 201 on the arms 195 engaging the margins of the end container in the stack. Further advance of the head unit 20 toward the stack forces the plate members 203 to swing outwardly a sufficient distance to permit the end members 202 on the arms 195 to clear the edges of the leading or endmost container in the stack whereupon advance of the head 20 is stopped and the ends of the arms 195 are forced inwardly toward the stack by pressure of the flat spring plate members 137 to seat marginal edge portions of the foremost container in the slots 200 behind the hook forming plates 202 (FIGURE 10B) and position the container for withdrawal from the stack upon retraction of the head 20. As the head 20 moves away from the stack, the arms 195 are retracted and the plate members 203 swing inwardly to position the spade members 212 for engagement with the next succeeding container in the stack, the stack being moved forward by properly timed operation of the stack forwarding or feeding members 140 and 140' through rotation of the shaft 144.

Figure 10C:
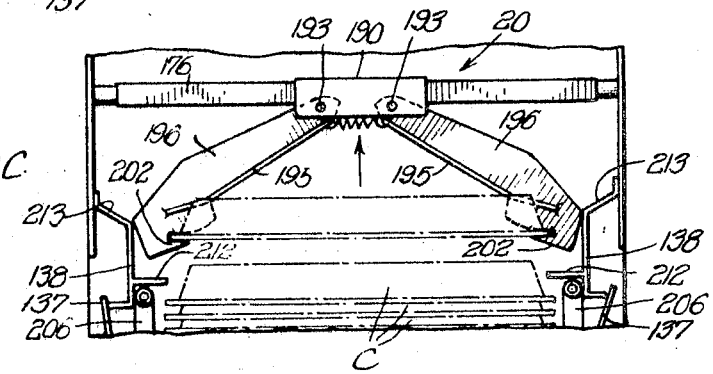

The container engaging flanges or spade members 212 move against the rim of the next container in the stack and prevent the same from following the leading container to which it may cling because of the nesting of the containers. The arms 195 engage in back of the margin of the endmost container in the stack and pull the container forwardly out of the stack (FIGURE 10C.) As the retracting or forward movement of the head 20 continues, the whole head assembly 20 is turned downwardly about the axis of the main cross bar 176 so as to swing the container which is held in the slots 200 downwardly through a 90° arc to a position where it overlies the trailing end of the conveyor table 20 (FIGURE 9). To turn the head assembly 20 through the 90° arc while it is moving forwardly and away from the forward end of the container stack the main cross bar 176 is provided at one end adjacent the side support plate 173 with a short, radially extending arm 215 (FIGURE 1) which is fixed thereon and which has a cam roller 216 operative in the upper portion 217 of the T-shaped slot 178. The arm 215 also has a cam forming finger extension 218 which engages a cam member 220 mounted on the plate 173 as the head 20 is moved away from the end of the stack so as to guide the cam roller 216 into the cam slot portion 217 which turns the rod 176 about its axis. Subsequent movement of the head unit 20 is downwardly towards the conveyor table 16 to a position to deposit the container thereon. The cam roller 216 travels during this movement in the vertically disposed portion of the T-shaped slot 177. The container is released from the head unit 20 by pressure on the ends of the arms 195 which occurs through engagement of the ends thereof with abutment forming plates 221 and 221' on the side edges of the table 16. The arms of each pair thereof are opened or spread apart so as to release the container as the head unit 20 reaches the end of its downward movement. The plates 221 and 221' are provided with outwardly and upwardly curved fingers 222 and 222' (FIGURE 9) at the ends thereof for centering the containers on the table for pick up by the conveyor 17.

The operation of the conveyor 17 is controlled so as to advance the containers to the packing station in proper timed relation and in proper position for deposit therein of the eggs by the transfer device 15. The conveyor 17 (FIGURES 1, 2, 2A, 9 and 17) comprises a chain 230 supported at one end on a sprocket 231 on the main drive shaft 130. At the other end the chain 230 is supported on a sprocket 232 on a cross shaft 233 journaled in the side plates 34 and 53 at the discharge end of the machine. The upper run of the conveyor 17 is carried in a longitudinally extending, upwardly opening recess 234 in the center of the table 16 and the chain is provided with a plurality of longitudinally spaced pusher members 235. The sprocket 231 has mounted on its one face in circumferentially spaced relation a group of five pins (FIGURES 2, 9 and 12) which extend parallel to the axis of the drive shaft 130 and which are spaced apart approximately 52°. Two pins 236 at one end of the group are longer than the remaining three pins 237. The spacing of the pins in the group is uniform and is such that rotation of the sprocket a distance corresponding to the distance between any two pins within the group advances the chain 230 an amount equal to the spacing between the two rows of egg receiving cells in a carton or between the rows of egg receiving pockets in a filler flat. The circumferential spacing between the two endmost pins 236 and 237 in the group is such that rotation of the sprocket 231 a corresponding amount advances successive filler flats, with the proper spacing, to the transfer or loading station while the circumferential spacing between the longer pins 236 in the direction away from each other is such that rotation of the sprocket 231 a corresponding amount advances successive cartons to the transfer or loading station in properly spaced relation. The sprocket 231 is combined with a slip clutch 238 on the shaft 130 so that it may be held against rotation thereon while the shaft 130 continues to rotate. A co-operating holding mechanism for engaging the pins 236 and 237 comprises a plate 239 mounted on a rock shaft 240 extending between the main frame side plates 133 and 133' and having on its free end a bracket 241 with a slot 242 in the outer end thereof for accommodating a pin 243 carried on the free end of one arm of a bell crank 244 which is pivoted at 245 on the bracket plate 241 and has a pivotal connection 246 at the end of its other arm with the end of a manual pull rod 247 which extends diagonally beneath the table 16. The pull rod 247 has a handle on the free end and enables the pin 243 to be swung back and forward in the slot 242. When the pin 243 is at the outermost end of the slot 243, as shown in FIGURE 11, and the bracket plate 239 is swung by rotation of the rock shaft 240 to operative position, the pin 243 will project into the path of the two longer pins 236 only on the side face of the sprocket 231. This provides for operation of conveyor 17 to handle cartons. When the pin 243 is moved to the other end of the slot 242 it is in the path of all five pins 236 and 237 and the conveyor 17 will be operated to handle filler flats. The rock shaft 240 has a lifting arm 250 at its one end which extends in a parallel plane along the inner face of the circular plate 129 on the power shaft 130 and has a cam forming bottom edge 251 which rests on a pin 252 projecting from the inside face of the plate member 129 so that rotation of the plate member 129 rocks the shaft 240 to move the control pin 243 into and out of position to engage with the pins 236 and 237 on the sprocket 231 and thereby control the rotation of the sprocket 231 and the advance of the conveyor 17. The pitman rod 120 is pivotally connected to the opposite or outside face of the plate 129 so that the egg transfer device 15 and the conveyor 17 are properly synchronized to advance successive containers to the packing or container loading station and position the same in the proper location for deposit of eggs in the containers by the transfer device 15.

The main power shaft 130 is driven by a motor 255 (FIGURES 1 and 3) suitably mounted on the main frame 35 and having a drive sprocket 256 which is connected by chain 257 with sprocket 258 on the power shaft 130. A bevel pinion 260 (FIGURES 2 and 9) on the power shaft 130 engages with a bevel pinion 261 on the longitudinal shaft 50 which drives the orienting conveyor 12 and associated mechanism. The pinion 261 is connected to the shaft 50 by a clutch 262 which is controlled by a solenoid 263 under the control of the electric eye device 93 (FIGURE 2A) so as to advance the conveyor 12 only when eggs are being delivered thereto so as to fill each successive pocket on the conveyor 12.

A belt-type discharge conveyor is indicated at 265 (FIGURES 1 and 2A) which is disposed between the side frame plates 34 and 53 at the leading end of the conveyor 17, with one end supported on the cross shaft 266 which is parallel with and spaced from cross shaft 233. The shaft 266 may be independently driven, by a separator motor, or it may be driven from the cross shaft 233 by the drive chain and sprocket connection shown at 267 so as to discharge the filled containers delivered by the conveyor 17.

The dispensing head 20 and the mechanism for feeding the cartons or filler flats from the supply magazine 18 is operated by the cross shaft 144 and rotation of the cross shaft 144 is controlled by solenoid 156'. The solenoid 156' is actuated by either one of two switches 270 or 271 (FIGURE 2A) depending upon which type of packing receptacle is being supplied. The switches 270 and 271 are mounted at opposite ends of the cross shaft 233 at the leading end of the conveyor 17 and are actuated by cam plates 272 and 273 on the shaft 233. The switches 270 and 271 are connected into a special control circuit (FIGURE 21) through a selector switch 274 which is manually operated. The electrical circuit includes a transistorized power supply and control unit indicated at 275, transformer 276, suitable manually operated disconnect switch 277 and electrical components for operating the various solenoids in proper timed relation. A receptacle 278 is provided for incorporating the drive motor 36 in the circuit. Also associated equipment may be connected into the circuit by means of the receptacle 280 so that its operation may be interrupted when the operation of the instant apparatus is interrupted.

In using the machine, a supply of either open cartons or filler flats, whichever is desired, is placed in the magazine 18, in stacked and nested relation and on the edge opposite the hinge in the case of cartons, with the open face toward the dispensing head 20. The position of plate 190 on the dispensing head 20 is adjusted on the cross bar 176 so that the leading packing receptacle or container in the stack is substantially centered when grasped by arms 195. The posts 135 and 135' are adjusted so that the guide assemblies 138 are at the proper height for cooperation with gripper arms 195 on the head 20. The pull rod 247 is operated, if required, to set the control pin 243 for proper indexing of conveyor 17 and the selector switch 274 is operated to provide for control of the dispensing head 20 and associated mechanism by switch 270 if cartons are being packed or switch 271 if filler flats are being packed. The power is turned on to operate the main motor 255. The eggs are supplied by the infeed conveyor 11 and under the control of the electric eye 93 the conveyor 12 is operated to advance the eggs to the orienting device 14 which flips over any eggs which are fed to the pockets of the conveyor in the position shown in phantom line in FIGURE 18 so that the eggs advance in single file and in properly oriented position as shown in solid line in FIGURE 18 to the transfer point where the leading egg on the conveyor 12 engages arm 123 and actuates switch 126 which controls the transfer device 15 and the advance of conveyor 17. The transfer device 15 is operated to automatically grip six eggs on the conveyor 12, which is held for the transfer, and to move the row of eggs in a generally horizontal path away from the conveyor 12, then to swing so as to bring the row of eggs into the vertical position and to deposit the eggs in the pockets of the container or conveyor 17 with the small ends on the bottom and the long axis generally vertical.

When it is desired to pack filler flats in place of cartons or vice versa, the operation of the machine is stopped momentarily while a nested stack of the desired containers is substituted in the magazine 18, the head 20 and cooperating guide assemblies 138 are adjusted, the pull rod is operated to reset the control pin 243 and the selector switch 274 is operated to activate the proper control switch 270 or 271 for dispensing the containers as required. The machine is then ready to resume operation with a very small time lapse required for the change over from one type packing container to the other. The machine continues to operate automatically so long as eggs are supplied by the infeed conveyor 11 and a supply of packing containers is maintained in the magazine 18.

While particular materials and specific details of construction are referred to in describing the form of the machine illustrated, it will be understood that other materials and equivalent structural details may be restorted to within the spirit of the invention.

We claim:
1. In an egg handling machine, an endless traveling egg supporting conveyor having a top run traveling in a generally horizontal plane, said conveyor having pockets for receiving eggs in single line, spaced relation with each pocket being constructed to support an egg with its long axis disposed horizontal, an egg orienting means associated with said conveyor for positioning each successive egg on said supporting conveyor with its long axis generally horizontal and the small end facing toward the same side of said supporting conveyor, a container supporting conveyor arranged with a top run thereof traveling in a path extending generally transverse of the path of said egg supporting conveyor, means for supplying egg accommodating containers to the top run of said container supporting conveyor in upright open position, means for advancing the top run of said container supporting conveyor so as to position successive containers at a transfer station adjacent said egg supporting conveyor, and a transfer device for successively lifting a plurality of said eggs which are in row relation from the egg supporting conveyor and depositing said eggs in containers advanced on the container supporting conveyor.

2. In an egg packing machine, an endless traveling egg supporting conveyor having a top run in a generally horizontal plane, said conveyor having pocket formations for receiving eggs in single line, spaced relation with each pocket formation constructed to support an egg with its long axis disposed horizontal, an egg orienting means disposed adjacent said conveyor for positioning successive eggs on said conveyor with the long axis generally horizontal and the small end at one side thereof so that the eggs are arranged in the same relative position on the conveyor, a container supporting conveyor arranged with a top run extending transversely of said egg supporting conveyor, means for supplying egg containers to the top run of said container supporting conveyor, means for advancing the top run of said container supporting conveyor so as to position successive containers at a transfer station adjacent said egg supporting conveyor, and a transfer device for gripping a predetermined number of eggs which are arranged in row forming relation on said egg supporting conveyor and conveying said eggs to containers on the container supporting conveyor for deposit therein with the long axes vertical and their small ends on the bottom.

3. Apparatus for handling small egg-shaped articles comprising a traveling conveyor having a run thereof disposed in a generally horizontal plane, said conveyor having pockets for receiving the articles in single file, spaced relation with each article supported with its long axis disposed horizontal, an article orienting means associated with said article conveyor for positioning the articles uniformly on the conveyor with each successive article having its long axis generally horizontal and the smaller end at one side of the conveyor, a container forwarding conveyor arranged with a run thereof traveling in a path extending transversely of the path of said article conveyor, means for supplying containers to said forwarding conveyor and for advancing the same to a transfer station adjacent said article conveyor, and a transfer device disposed at one side of said conveyor for moving in succession groups of a predetermined number of articles which are in row forming relation from the article conveyor to containers on the forwarding conveyor.

4. A machine for handling small egg-shaped articles comprising an article conveyor having a run thereof traveling in a generally horizontal plane and pocket formations for receiving the articles in single line, spaced relation with each pocket adapted to support an article with its long axis disposed in random position thereon, an article orienting means associated with said article conveyor for moving each successive article on the article conveyor so that its long axis and its small end are in predetermined position thereon and the articles are arranged uniformly, a container advancing conveyor arranged with a run thereof traveling in a path extending transversely of the path of said article conveyor, means for supplying containers to said container conveyor, means for advancing said container conveyor to position successive containers at a transfer station adjacent said article conveyor, and a transfer device for moving successive rows of uniformly arranged articles from the article conveyor to containers on the container conveyor.

5. An egg packing machine comprising an endless traveling egg supporting conveyor having a top run traveling in a generally horizontal path, said conveyor having pocket formations for receiving eggs arranged in single file, spaced relation with each pocket formation adapted to receive an egg with its long axis disposed in a generally transverse plane, means for supplying eggs to said egg conveyor, an egg orienting means adjacent said egg conveyor for positioning each successive egg is a pocket formation so that it is disposed with its long axis generally horizontal and its smaller end facing in a predetermined direction, an endless traveling container conveyor arranged with a top run traveling in a path extending transversely of the path of said egg conveyor, means for supplying egg containers having one or more rows of egg pockets to the top run of said container conveyor, means for operating said container conveyor so as to position successive containers at a transfer station adjacent the top run of said egg conveyor, and an egg gripping transfer device for moving a predetermined number of eggs from the egg conveyor to the pockets of a container at the transfer station.

6. An egg packing machine as recited in claim 5, and means actuated by the passage of eggs to the egg conveyor to control the operation of the egg conveyor, the container conveyor, the container supply means and the transfer device so as to provide for automatic packing of the eggs in predetermined position in the pockets of successive containers.

7. A machine for packing egg-shaped articles comprising a traveling conveyor having a run thereof in a generally horizontal plane, means for feeding articles to the conveyor with the articles disposed in random position, an orienting means associated with the conveyor for arranging the articles in single file and in uniform position on the conveyor, a packing receptacle conveyor arranged to deliver successive packing receptacles to a packing station adjacent the article conveyor, means for feeding receptacles to the receptacle conveyor in upwardly opening position for receiving the articles, and an article transfer device at the packing station for transferring the articles in groups of a predetermined number to receptacles at the packing station, said orienting means comprising a wheel-like frame mounted for rotation on a generally horizontal axis above the article conveyor and having axially spaced plate assemblies, said plate assemblies comprising a plurality of plate sections arranged in oppositely disposed, paired relation and pivotally mounted on a supporting hub with the peripheral edges traveling in paths which are adapted to intersect the path of articles passing beneath the same and to engage the edges of the plate sections with the uppermost surfaces of successive articles at opposite ends of the long axes thereof and thereby cause the articles to rock about their short axes whereby to position each article on the conveyor with the long axes in predetermined position.

8. A machine for packing egg-shaped articles comprising a traveling conveyor having a run thereof in a generally horizontal plane, means for feeding articles to the conveyor in random position, an orienting means associated with the conveyor for arranging the articles in single file and uniform position on said conveyor, a packing receptacle conveyor arranged to deliver packing receptacles to a packing station adjacent said article conveyor, means for feeding packing receptacles to the forwarding conveyor in upwardly opening position for receiving the articles, and an article transfer device at the packing station for transferring the articles in rows of a predetermined number to receptacles at the packing station, said orienting means comprising a frame mounted for rotation on a generally horizontal axis above the article conveyor, axially spaced plate assemblies on said orienting device with a plurality of pivotally mounted plate sections arranged in oppositely disposed, paired relation with the peripheral margins of said plate sections adapted to engage the uppermost surface of each successive article at opposite ends of the long axis thereof so as to cause the articles to rotate in predetermined directions about their short axes whereby each article is positioned on the conveyor with the long axis horizontal and the small end facing in a predetermined direction.

9. A machine for handling small egg-shaped articles comprising an article conveyor having a run thereof traveling in a generally horizontal plane and pocket formations for receiving the articles in single file relation with each pocket adapted to support an article with its long axis extending horizontal, an article orienting assembly co-operating with said article conveyor and moving each successive egg into a position on said conveyor where its long axis is generally horizontal and its small end is at one side of said conveyor, a container conveyor arranged adjacent the article conveyor, means for feeding successive containers to said container conveyor, means for advancing said container conveyor to position successive containers at a transfer station adjacent said article conveyor, and a transfer device extending along one side of said article conveyor and operative to move successive rows of a predetermined number of the articles which are disposed in uniform arrangement on said article conveyor from said article conveyor to containers on the container conveyor with the articles arranged uniformly in the containers.

10. A machine for packing egg-shaped articles comprising a traveling conveyor having a run thereof in a generally horizontal plane, means for feeding articles to said conveyor in random position, an article positioning mechanism associated with the conveyor for arranging the articles in single file and uniform position on the conveyor, a packing receptacle conveyor arranged to deliver packing receptacles to a packing station adjacent the article conveyor, means for feeding packing receptacles to the forwarding conveyor in upright open position for receiving the articles, and an article transfer device at the packing station for transferring the articles in rows of a predetermined number to receptacles at the packing station, said article positioning mechanism comprising a wheel-like frame mounted for rotation on a generally horizontal axis above said article conveyor, said article positioning device having axially spaced plate assemblies with the peripheral margins traveling in paths above the article conveyor so as to engage the uppermost surface of successive articles and cause the articles to be positioned uniformly on the conveyor with the long axis vertical and the small end at a predetermined side of the conveyor.

11. A machine for packing egg-shaped articles comprising a traveling conveyor having a run thereof in a generally horizontal plane, means for feeding articles to the conveyor in random position, an orienting means associated with said traveling conveyor for arranging the articles in single file and uniform position on the conveyor, a packing receptacle conveyor arranged to deliver packing receptacles to a packing station adjacent the article conveyor, means for feeding packing receptacles from a supply magazine to the receptacle conveyor in upwardly open position for receiving the articles, and an article transfer device at the packing station for picking up the articles which are in row formation on the article conveyor and for transferring successive rows of articles to receptacles at the packing station, power means for operating the transfer device and the article and receptacle conveyors, and control means for said power means which is responsive to the advance of articles to the article conveyor and which interrupts the operation of the machine upon failure of the article feed means to maintain a continuous supply of articles.

12. In an egg handling machine, an endless traveling egg conveyor having a run traveling in a generally horizontal path, said conveyor having pockets for receiving eggs in single file relation with each pocket being constructed to support an egg with its long axis extending horizontally or vertically, means associated with said conveyor for causing each successive egg to assume a position in a conveyor pocket with its long axis generally horizontal and its small end at a predetermined side of the conveyor, a container conveyor arranged with a run thereof traveling in a path extending to a transfer station adjacent said egg conveyor, means for supplying egg containers to said container conveyor in upright position, means for advancing said container conveyor to position successive containers at said transfer station, and transfer means for moving rows of a predetermined number of eggs from the egg conveyor to containers on the container conveyor.

13. In an egg handling machine as recited in claim 12, and power means for driving the egg conveyor and control means therefor which is responsive to the passage of an egg into a pocket of the egg conveyor whereby to stop the egg conveyor when the feeding of the eggs is interrupted.

14. In an egg handling machine as recited in claim 13 and power means for operating the container conveyor and the transfer means which is responsive to predetermined advance of the egg conveyor with eggs positioned in the pockets thereof.

15. In an egg handling machine as recited in claim 13 and power means for operating the egg container supply means which is responsive to predetermined advancing movement of the container conveyor.

References Cited
UNITED STATES PATENTS

| | | | |
|---|---|---|---|
| 2,993,621 | 7/1961 | Mumma | 53—246 XR |
| 3,169,354 | 2/1965 | Bliss et al. | 53—61 |
| 3,193,980 | 7/1965 | Mumma | 53—61 XR |
| 3,311,216 | 3/1967 | Jones | 53—61 XR |

TRAVIS S. McGEHEE, Primary Examiner

U.S. Cl. X.R.

53—246, 251; 198—33; 221—221